F350D XR 3,325,819

June 13, 1967 E. E. FRASER 3,325,819

COHERENT LIGHT CARD MARKING SYSTEM

Filed March 15, 1965 3 Sheets-Sheet 1

INVENTOR
EDMUND E. FRASER

BY Strauch, Nolan, Neale, Nies and Bronaugh
ATTORNEYS

COHERENT LIGHT CARD MARKING SYSTEM

Filed March 15, 1965 3 Sheets-Sheet 2

INVENTOR
EDMUND E. FRASER
BY Strauch, Nolan, Neale, Nies and Bronaugh
ATTORNEYS

INVENTOR
EDMUND E. FRASER

BY Strauch, Nolan, Neale, Nies and Bronaugh
ATTORNEYS 3,325,819

COHERENT LIGHT CARD MARKING SYSTEM

Edmund Everrette Fraser, Charlottesville, Va.
(12508 Eastbourne Drive, Silver Spring, Md. 20904)

Filed Mar. 15, 1965, Ser. No. 439,822
13 Claims. (Cl. 346—76)

The present invention relates to a system and apparatus for marking data storage record members employing a source of electro-magnetic radiation and, in particular, to such apparatus using a coherent light source which produces substantially parallel rays of light along a single narrow beam, variously known as optical lasers or masers.

It is well known to transfer data from a source of information such as a card, tape, electronic storage register or other device to a record member which may be a card, tape, etc. for use in data processing systems. Normally, when such members are used for data storage, they are marked or perforated by mechanical means at selected positions in accordance with a predetermined code.

A principal object of this invention resides in the use of a monochromatic radiation generator such as a coherent light generator to perforate or mark otherwise at selected positions on the record member at a much greater rate of speed than prior art devices. It is thus possible to mark or perforate a record member such as a paper tape or the familiar IBM card with bursts or pulses of radiation that last no longer than a microsecond or even less, thereby enabling the marking of such member to be made while the members are in continuous movement at a velocity limited only by the record member handling apparatus.

Another object of this invention is to provide novel apparatus which has a means for detecting the position of the record member as it passes the target field of the monochromatic radiation source to thereby enable coordination of the position of the record member with the information to be recorded from the information source to thus cause energization of the radiation source at the appropriate instant to cause marking of the record member at the desired location.

A further object of this invention is to provide novel apparatus which uses a plurality of coherent light generators for simultaneously perforating parallel positions on a record member along a single column perpendicular to the direction of feed of the record member in accordance with a predetermined scheme.

Yet another object of this invention is to provide a novel arrangement of coherent light generating sources which enable very close spacing of the light beams such that markings or perforations made in a record member can be closely spaced. Such arrangement may involve use of reflectors and/or lenses that are fixedly mounted or movably mounted relative to the beam source and record member.

A yet further object of this invention is to provide novel apparatus for marking or perforating selected positions on a card member according to a predetermined scheme, wherein the apparatus utilizes a single coherent light generator and a rotatable multi-surfaced reflector which directs the beam from the coherent light generator to selected positions on the record member.

These and other objects of the invention will become more fully apparent from the claims, and from the description as it proceeds in connection with the appended drawings wherein:

Figure 6:
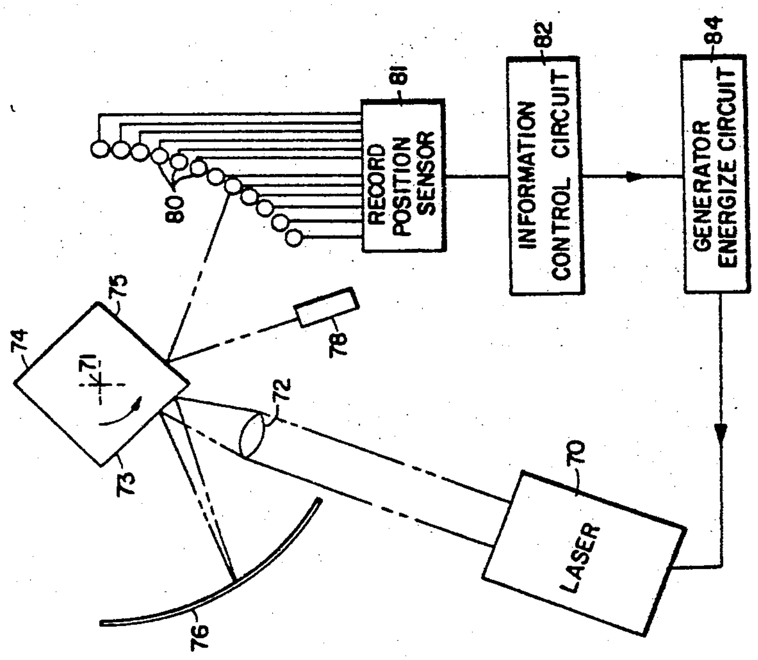
Figure 7:
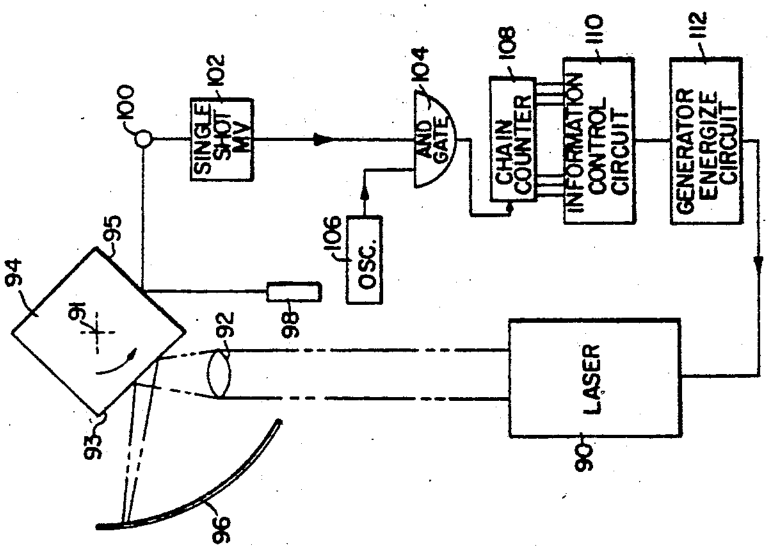

FIGURE 6 is a top plan view of a further embodiment adapted for using only one monochromatic radiation generating means with a rotating reflecting member to thereby move the target area of the beam across a record member to be selectively marked; and FIGURE 7 is a similar view of a similar system adapted to utilize only one photocell for synchronizing the electronics of the system with the physical movement of the target area relative to the record member.

Figure 1:
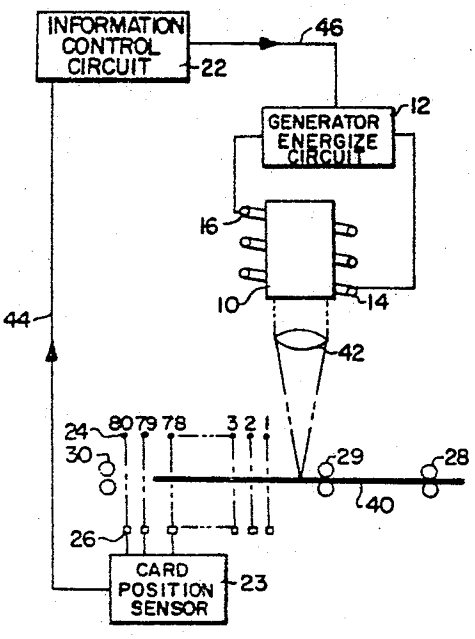
FIGURE 1 is a block diagram of the system of the present invention.

As shown in FIGURE 1, the system of the present invention utilizes a monochromatic radiation generator i.e. a coherent light generator such as a laser, maser or the like 10, a generator energize circuit 12 having terminals 14 and 16 which causes generator 10 to emit short pulses having a length on the order of a microsecond or less which are effective to burn a hole in a record member such as a paper tape or card. Also, in the basic system are an information control circuit 22, a card position sensor 23 which may comprise a series of light sources 24 and photocells 26 and means for advancing the record member which may comprise roller pairs 28 and 30. A means for varying the focal length of generator 10 such as lens 42 may also be provided for controlling the size of the perforation made in record member 40.

Monochromatic radiation generators used in this invention are well known; the details of their construction and their specific operation is not believed necessary here other than to indicate that the emitted pulse of energy is used to burn a hole in the record member at the desired location in the information field.

Information control circuit 22 may be of any suitable type capable of providing a source of binary information. A register having a number of relays, trigger circuits or the like, equal in number to the number of information channels in the record member may be provided. Thus, for an 80-column, twelve row card such as illustrated in FIGURE 2, 960 binary stages may be provided; or alternatively, only twelve stages need be provided at any instant and their condition changed as the card advances from column to column.

Correlation of the information from information control circuit 22 with the position of card 40 is necessary. This may be accomplished for example by a card position sensor 23 containing 80 photocells 26 which are illuminated by a light source 24 which may comprise separate bulbs. As the leading edge of the card advances, the photocells are sequentially shielded from their light sources to thus provide the necessary indexing of the position of the card.

As the card 40 advances, a signal from card position sensor 23 is applied as by a connection 44 to effect the corresponding advancement of a scanning arrangement in information control circuit 22. The output from information control circuit 22 on lead 46 to generator energize circuit 12 is present only when card 40 is at a position where a column is aligned with the target area of the output beam from laser 10 and when the information in information control circuit 22 requires a hole to be placed in the record.

Figure 3:
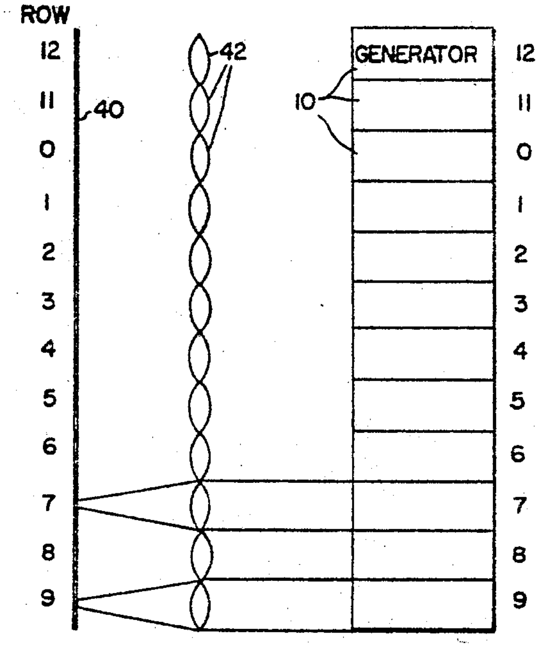
FIGURE 3 is a view in elevation showing the use of twelve separate generators for selectively marking the card shown in FIGURE 2.
Figure 2:
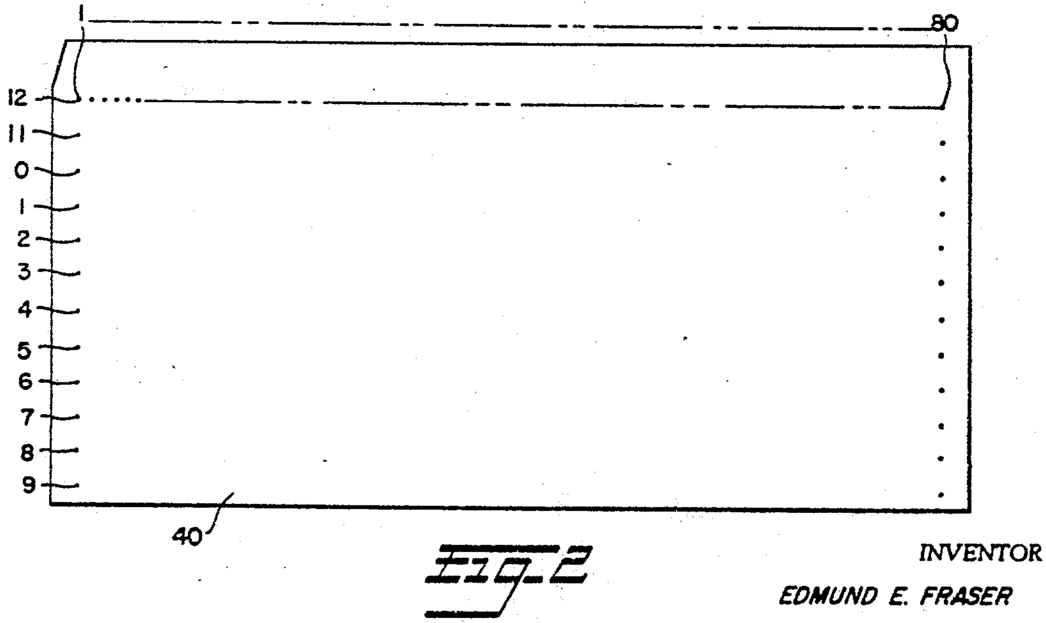
FIGURE 2 is a diagram of an 80-column card, each column having twelve rows which is hereinafter referred to as a conventional IBM card.

With reference to FIGURE 3, an array of twelve lasers 10 are provided, one for each of the twelve rows in the card of FIGURE 2, with each laser 10 connected to a separate energize circuit 12 as shown in FIGURE 1, and each energize circuit 12 provided with information from a separate channel in information control circuit 22. In this embodiment, all twelve horizontal rows on the record member may be perforated during a single passage of card 40 through rollers 28, 29 and 30, and any one or all twelve positions in any given column may be perforated simultaneously as record member 40 is advanced in the direction of the length of card 40 past the target area of the array of lasers.

The operation of the system illustrated in FIGURES 1–3 is as follows:

Card 40 is inserted in rollers 28 which advance the card from right to left as shown in FIGURE 1 past rollers 29 and past the beam from generator 10. As the leading edge of record member 40 interrupts the first light beam from light sources 24 to photocells 26, the position of card 40 is fed into the information control circuit 22 which then provides the signals to generator energize circuit 12 depending upon the information in information control circuit 22 to be recorded. A signal-on connection 44 identifies when each of the 80 positions of the card member 40 corresponding to the 80 columns of the card is aligned with the target area of the beams from lasers 10, and the outputs from information control circuit 22 provide the signal to the respective generator energize circuits 12 for the corresponding lases whose output beam causes a hole to be burned in the card. The card thus will be perforated with the desired pattern.

In FIGURE 3, two generators coresponding to the vertical positions of rows 7 and 9 are shown in the energize condition for perforating the 7 and 9 positions in a single vertical column of record member 40.

Figure 4:
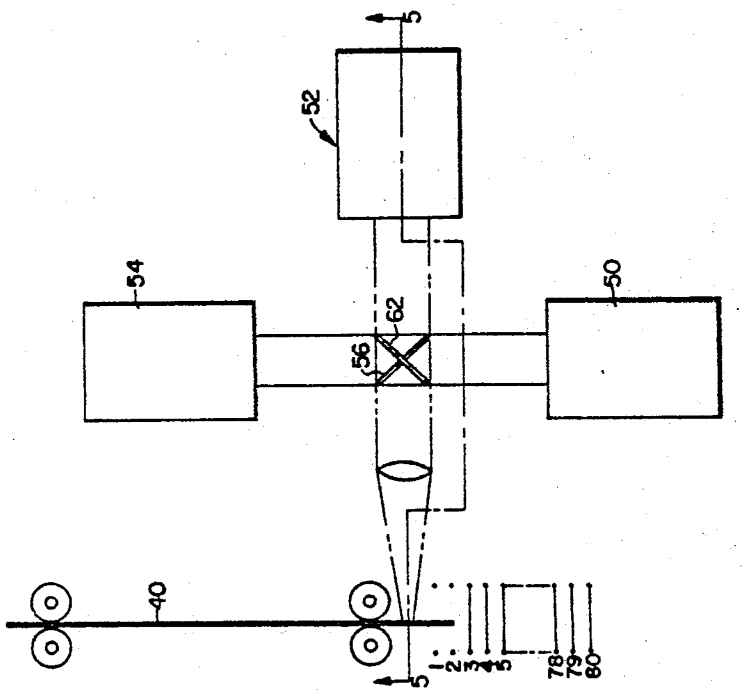
FIGURE 4 is a top plan view of a system embodying three stacks of laser generators which are angularly oriented relative to each other and to the record member to facilitate focusing of the high energy beams on adjacent positions of a record member.
Figure 5:
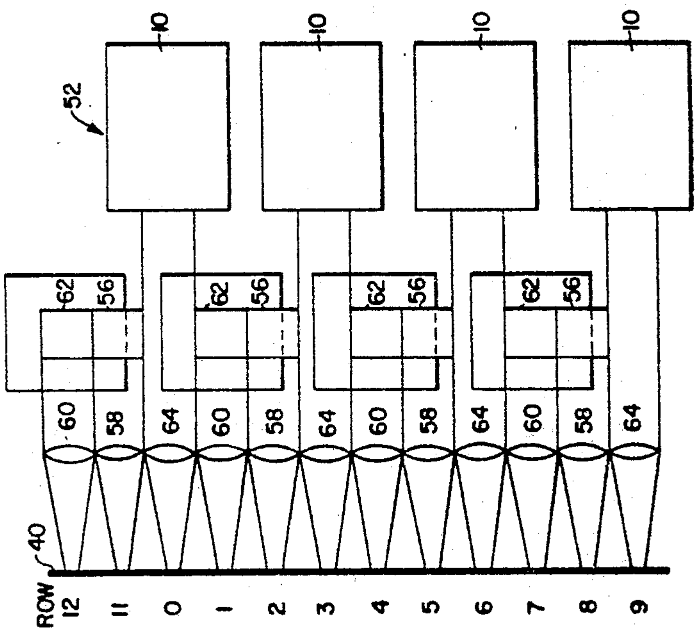
FIGURE 5 is a view in elevation taken along line 5—5 of FIGURE 4.

To simplify the matter of spacing of the lasers and focusing of the beams in a target area so that adjacent rows of holes in conventional cards or tapes can be burned simultaneously, an arrangement of the lase or equivalent generators may be used as is illustrated in FIGURES 4 and 5. FIGURE 4 is a top plan view and FIGURE 5 is an elevation in partial section that is taken along line 5—5 of FIGURE 4. In this arrangement, three vertical stacks 50, 52 and 54 as shown in FIGURE 4, each comprising four lasers are provided as shown in FIGURE 5.

Each of the stacks 50, 52 and 54 comprises four generators 10. Stack 50 is arranged at substantially right angles from card 40 so that the beams are directed to the card by mirrors 56 and focused by lenses 58 on the 8, 5, 2 and 11 rows of card 40. Stack 54 is arranged to face stack 50 and is also at substantially right angles from card 40 so that the beams are directed to the card by mirrors 62 and focused by lenses 60 on the 7, 4, 1 and 12 rows of card 40. Stack 52 is arranged to face card 40 directly whereby no mirror is required and lenses 64 are associated with the 9, 6, 3 and 0 rows of card 40.

This arrangement is thus provided with a series of mirrors 56 and 62 disposed one above the other in separate vertical planes which intersect each other at 90° angles as shown in FIGURE 4. It is apparent that the angle of the mirrors depends upon the angular disposition of stacks 50 and 54, and that the stacks may be located in any convenient angle that is effective to permit a staggered location of adjacent laser generators.

The operation of the system shown in FIGURE 4, is the same as that shown in FIGURES 1 and 3. Each of the generators in stacks 50, 52 and 54 may be connected to a separate generator energize circuit (FIGURE 1) which in turn may be connected to a separate information register in an information control circuit (FIGURE 1). The information control circuit is sequenced at each position of record member 40 by a card position sensor as in the embodiment described in connection with the system of FIGURE 1.

A further embodiment of this invention is illustrated in FIGURE 6. In this embodiment, a single generator or laser 70 may be used for producing a beam which may be directed through a focusing lens 72 to contact a reflecting member 74 rotatably mounted on a horizontal axis 71. Reflecting member 74 is provided with at least two reflecting surfaces 73 and 75. Reflecting surface 73 directs the beam from generator 70 to a predetermined position on a card member 76. Card 76 is mounted along an arc of a circle having a center located such that the focus of the beam from generator 70 will always be at the card surface. All surfaces of reflecting member 74, of course, may be reflecting surfaces so that member 74 may be rotated continuously about axis 71. With this arrangement, record member 76, which may be a tape, is moved intermittently in a direction perpendicular to the plane of the sheet of drawing and the target area of the beam from generator 70 caused to sweep all vertical rows on the record member while stationary, and thereafter the record member is advanced to the next position.

A means for sensing the position of the record member may comprise a light source 78 which projects a sharply focused beam of light on reflecting surface 75 which in turn reflects the beam according to its position to one of a series of photocells 80. Where the record has twelve rows, twelve photocells may be used. If the record is 5 or 8 channel tape, only a corresponding number of photocells would be required. Photocells 80, as described with respect to FIGURE 1, are each connected to form part of the record position sensor 81 and the output applied to information control circuit 82 which in turn is connected to a generator energize circuit 84 for energizing generator 70.

It is contemplated that with this embodiment, a single generator 70 could be used to perforate any given column position in a particular row on an 80-column card or similar record member 76. By using more than one generator, arranged for example as in the embodiment described in connection with FIGURES 4 and 5, all of the columns on card member 76 could be perforated while card member 76 is stationary.

The embodiment shown in FIGURE 7 is similar to that shown in FIGURE 6 excepting that reflector 74 must be driven at a constant speed to rotate about axis 71. Only one photocell 100 is utilized in the record member position detector. The output from photocell 100 is applied to a single shot multivibrator 102 which supplies one input to "and" gate 104 and hence conditions the "and" gate to pass pulses from an oscillator 106 running at a frequency correlated with the speed of rotation of mirror 94. The output from "and" gate 104 is applied as an input to chain counter 108 which serves as a distributor to synchronize operation of information control circuit 110 with movement of the target area from generator 90.

It is apparent that a record member with any number of rows and columns which determine a plurality of positions capable of being perforated or otherwise marked by a pulsed beam of radiation would be capable of being used with the apparatus of this invention. The conventional type of card record member containing twelve rows and eighty columns has been discussed solely for purposes of explaining this invention. In some applications, marking of the record member may be by discoloration resulting from a charring as distinguished from a complete burning of a hole; also it may be desirable to utilize specially treated paper or cards where dye coloration or other chemical reactions occur in response to a brief exposure to intense radiation that result in machine recognizable markings.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for selectively marking a record member in accordance with predetermined information comprising:
 (a) a record member having an elongated information field composed of a material adapted for selective marking;
 (b) means for providing a source of information for recording on said record member; and
 (c) means for selectively marking said elongated information field in accordance with information from said source comprising:
  (1) a pulse type monochromatic radiation generating means capable of producing pulses of beamed radiation at a target area effective to mark said record member;
  (2) means for providing relative movement between the record member and said target area;
  (3) means detecting the position of said record member relative to said target area; and
  (4) means to energize selectively said generating means in response to output signals from said detecting means and from said information source to thereby mark said record member in accordance with information from said information source.

2. Apparatus as defined in claim 1 wherein said detecting means comprises:
 (a) a light source and photocell circuit arranged so that the rays produced by said light source are interrupted as said record member and said target area are moved relative to one another to thereby produce a signal indicative of the position of the record member relative to the target area; and
 (b) circuit means connected from said photocell circuit and from said information source for controlling time of energization of said generating means.

3. Apparatus as defined in claim 2 wherein the light source and photocell circuit comprises a plurality of photocells spaced to indicate when the columns in the information field on said record member are located at the target area of said generating means.

4. Apparatus as defined in claim 3 wherein the record member is moved between the light source and photocells and the target area of the generating means is fixed.

5. Apparatus as defined in claim 3 wherein the record member is held stationary while the target area for the generating means is moved.

6. Apparatus as defined in claim 1 wherein said monochromatic radiation generating means comprises a coherent light generator and said generator is arranged relative to the record member so as to form said marking by burning a hole in the information field of the record member.

7. Apparatus as defined in claim 1 wherein said means for providing relative movement between the record member and the target area comprises a member having a reflecting surface mounted for rotation about an axis, said reflecting surface being located between the generating means and the record member and effecting a movement of said target area along said information field.

8. Apparatus as defined in claim 7 wherein said detecting means comprises a circuit containing a photocell actuated by light reflected from said rotatably mounted member and wherein the output signal from said photocell circuit is applied to said information source for synchronizing the output signal from said information source with the relative position of the target area and said record member.

9. Apparatus as defined in claim 8 wherein said circuit contains a plurality of photocells equal to the number of information channels extending in one direction across said record member.

10. Apparatus as defined in claim 8 wherein said detecting means further comprises a free running oscillator having a frequency correlated with the speed of rotation of said rotating member, a counting circuit having output terminals connected to said source of information; and a gate means opened in response to a signal from the photocell for applying signals from said oscillator to said counting circuit for synchronizing the output signal from said information source with the relative position of the target area and said record member.

11. Apparatus as defined in claim 1 wherein the record member has a plurality of parallel information channels and wherein a plurality of generating means are provided, one for each channel of information with the generating means for adjacent information channels being offset from one another and at least one of said offset generating means having its radiation beam directed to the record member via a reflecting surface.

12. Apparatus as defined in claim 1 wherein the record member has a plurality of parallel information channels in excess of four and a plurality of generating means are provided, one for each channel of information with the generating means for adjacent information channels being offset from one another in separate stacks, and at least one of said stacks of generating means having its radiation beams directed to the record member via a reflecting surface.

13. Apparatus as defined in claim 12 wherein the generating means are mounted in three separate stacks with two of the stacks located so that their radiation beams are directed to the record member via separate reflecting surfaces, and the radiation beams of the generating means in the third stack are directed to the record member without the use of a reflecting surface.

References Cited

UNITED STATES PATENTS

| | | | |
|---|---|---|---|
| 3,114,841 | 12/1963 | Paananen | 250—219 |
| 3,287,736 | 11/1966 | Germer | 250—219 X |
| 3,293,652 | 12/1966 | Roshon et al. | 346—76 |

RICHARD B. WILKINSON, *Primary Examiner.*

J. W. HARTARY, *Assistant Examiner.*